United States Patent
Fujimoto

(10) Patent No.: US 7,801,554 B2
(45) Date of Patent: Sep. 21, 2010

(54) CONTENT RECEPTION SYSTEM

(75) Inventor: Munehiko Fujimoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 476 days.

(21) Appl. No.: 11/855,729

(22) Filed: Sep. 14, 2007

(65) Prior Publication Data

US 2008/0068196 A1    Mar. 20, 2008

(30) Foreign Application Priority Data

Sep. 19, 2006    (JP) .............................. 2006-253024

(51) Int. Cl.
*H04B 1/38* (2006.01)
*H04M 1/00* (2006.01)

(52) U.S. Cl. ................. 455/550.1; 455/569.2; 455/3.01; 455/67.11

(58) Field of Classification Search ............... 455/3.01, 455/3.03, 414.1, 419, 452.1, 456.1, 509, 455/514, 517, 67.11, 569.2, 573, 345, 346, 455/556.1, 550.1; 714/798; 340/669
See application file for complete search history.

(56) References Cited

U.S. PATENT DOCUMENTS

| 2002/0058521 | A1 | 5/2002 | Yamada et al. | |
| 2006/0069740 | A1* | 3/2006 | Ando et al. | 709/217 |
| 2006/0156209 | A1* | 7/2006 | Matsuura et al. | 714/798 |
| 2009/0279839 | A1* | 11/2009 | Nakamura et al. | 340/438 |

FOREIGN PATENT DOCUMENTS

| GB | 2 396 784 A | 6/2004 |
| JP | 2-50533 A | 2/1990 |
| JP | 4-229397 A | 8/1992 |
| JP | 8-286681 A | 11/1996 |
| JP | 2002-152319 A | 5/2002 |
| JP | 2002-182669 A | 6/2002 |

(Continued)

OTHER PUBLICATIONS

Japanese Office Action dated Jul. 8, 2008 w/English translation (six (6) pages).

(Continued)

*Primary Examiner*—John Lee
(74) *Attorney, Agent, or Firm*—Crowell & Moring LLP

(57) ABSTRACT

A content reception system, includes: a server; and a mobile client device which is connected to the server through a network to receive a content transmitted from the server, wherein the server includes: a content storage unit for storing a plurality of contents; and a list storage unit for storing a content list of the plurality of contents, and wherein the mobile client device includes: a stop detection unit for detecting that movement of the mobile client device is stopped; a judgment unit for judging that the mobile client device is in a predetermined stop state based on a detecting result obtained by the stop detection unit; a list obtaining unit for obtaining at least a part of the content list from the list storage unit of the server when the judgment unit judges that the mobile client device is in the stop state; a selection unit for selecting a content from the content list obtained by the list obtaining unit; and a content obtaining unit for obtaining the content selected by the selection unit, from the server.

6 Claims, 12 Drawing Sheets

FOREIGN PATENT DOCUMENTS

| | | |
|---|---|---|
| JP | 2004-139171 A | 5/2004 |
| JP | 2004-295596 A | 10/2004 |
| JP | 2004-297121 A | 10/2004 |
| JP | 2005-94497 A | 4/2005 |
| JP | 2005-184783 A | 7/2005 |
| JP | 2006-18709 A | 1/2006 |

OTHER PUBLICATIONS

The Extended European Search Report dated Dec. 20, 2007 (Seven (7) pages).

* cited by examiner

CONTENT RECEPTION SYSTEM

BACKGROUND OF THE INVENTION

1. Field of the Invention

The present invention relates to a content reception system.

2. Description of the Related Art

There have been known content reception systems each including a server transmitting contents via a network and a client device receiving the contents from the server (for example, Patent Literatures 1 to 3). For example, in one of such content reception systems, the client device receives a content list from the server and selects a content from the content list (for example, Patent Literature 1).

In another system, the client device receives contents in an order of a content list received from the server (for example, Patent Literature 2).

In still another system, the client device receives a content ID list from the server and distinguishes a content with an expiration date allowed to be updated from a content with an expiration date not allowed to be updated based on the content ID list (for example, Patent Literature 3).

Patent Literature 1: Japanese Patent Laid-open Publication No. 2005-184783

Patent Literature 2: Japanese Patent Laid-open Publication No. 2004-295596

Patent Literature 3: Japanese Patent Laid-open Publication No. 2006-018709

However, in the case where the client device is a mobile client device with high mobility such as an HDD/flash storage audio player, a mobile phone, or an automobile, communications are sometimes unstable while the client device moves. When the communications become unstable during the transmission of the content list from the server, the client device cannot receive the content list and contents. Therefore, a user may consciously stop moving and receive the content list or contents. However, the high mobility of the mobile client device is degraded, and the mobile client device has usability.

SUMMARY OF THE INVENTION

An object of the present invention is to provide a content reception system in which a mobile client device receives a content list and contents from a server more reliably and suitably.

In accordance with a first aspect of the invention, a content reception system, comprises:

a server; and a mobile client device which is connected to the server through a network to receive a content transmitted from the server and is mounted on an automobile, wherein the server comprises:

a first content storage unit for storing a plurality of contents;

a first list storage unit for storing a first content list of the plurality of contents; and a transmission unit for transmitting at least a part of the contents stored in the first content storage unit and a part of the first content list stored in the first list storage unit to the mobile client device according to a request from the mobile client device, and wherein the mobile client device comprises:

a second content storage unit for storing contents;

a stop detection unit for detecting that the automobile is stopped;

a judgment unit for judging that the mobile client device is stopped after a predetermined period of time elapses since the stop detection unit detects that the automobile is stopped;

a list obtaining unit for obtaining a content list matching a predetermined search criterion from the first content list stored in the first list storage unit of the server when the judgment unit judges that the mobile client device is stopped;

a second list storage unit for storing a second content list of the contents stored in the second content storage unit;

an automatic selection unit for selecting a content obtained by a difference between the content list obtained by the list obtaining unit and the second content list stored in the second list storage unit; and a content obtaining unit for obtaining the content selected by the automatic selection unit, from the server.

In accordance with a second aspect of the invention, A content reception system, comprises:

a server; and a mobile client device which is connected to the server through a network to receive a content transmitted from the server, wherein the server comprises:

a content storage unit for storing a plurality of contents; and a list storage unit for storing a content list of the plurality of contents, and wherein the mobile client device comprises:

a stop detection unit for detecting that movement of the mobile client device is stopped;

a judgment unit for judging that the mobile client device is in a predetermined stop state based on a detecting result obtained by the stop detection unit;

a list obtaining unit for obtaining at least a part of the content list from the list storage unit of the server when the judgment unit judges that the mobile client device is in the stop state;

a selection unit for selecting a content from the content list obtained by the list obtaining unit; and a content obtaining unit for obtaining the content selected by the selection unit, from the server.

BRIEF DESCRIPTION OF THE DRAWINGS

The present invention will become fully understood from the detailed description given hereinafter and the accompanying drawings given by way of illustration only, and thus are not intended as a definition of the limits of the present invention, wherein.

PREFERRED EMBODIMENT OF THE INVENTION

Figure 1:
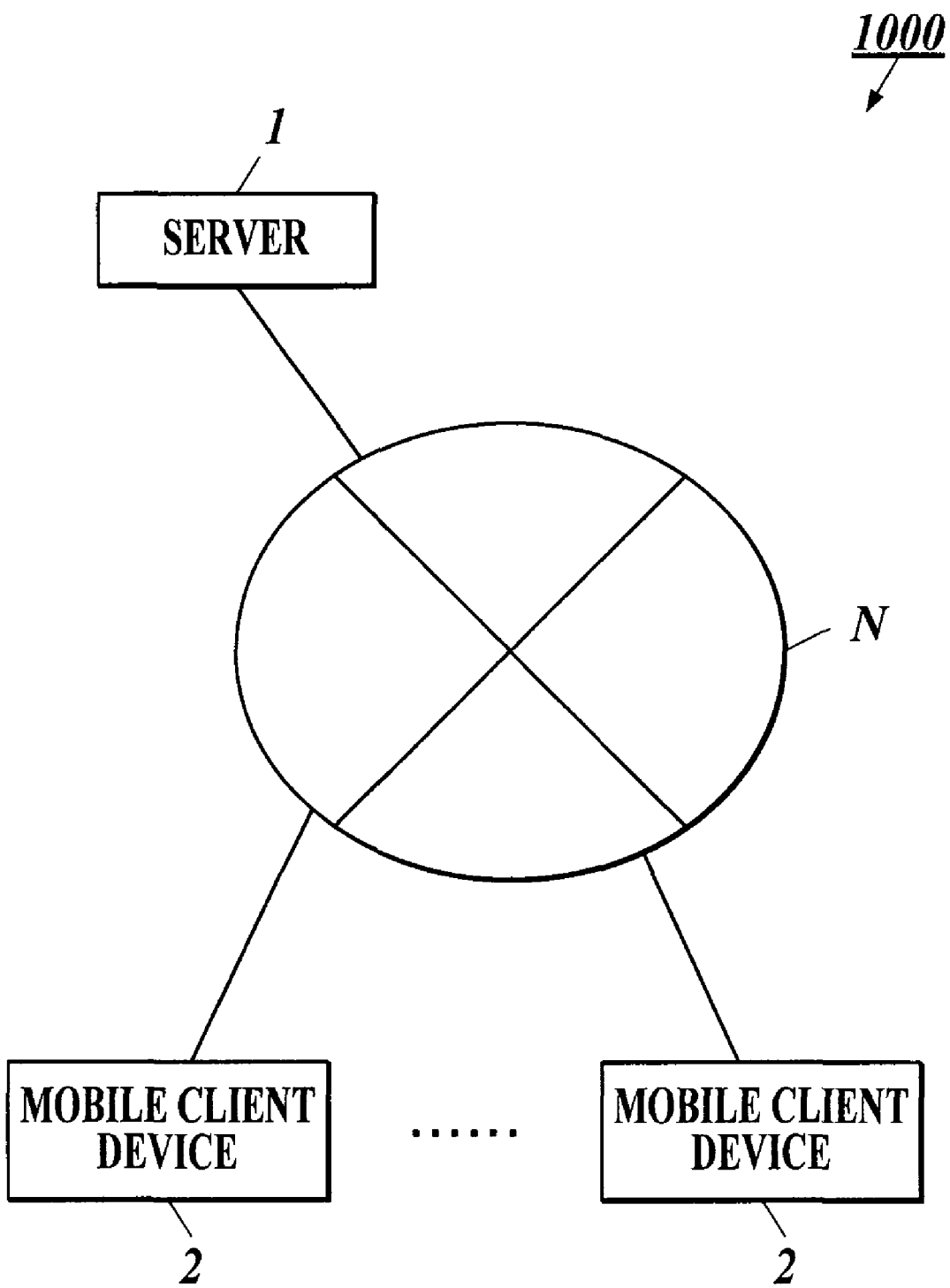
FIG. 1 is a view showing a schematic configuration of a content reception system according to a first embodiment of the present invention.

Hereinafter, a description is given of best modes for carrying out a content reception system according to the present invention.

First Embodiment

First, a content reception system 1000 according to a first embodiment of the present invention includes, for example: a server 1; and mobile client devices 2 connected to the server 1 through a network N to receive contents transmitted from the server 1 and mounted on automobiles.

The numbers of the server 1 and the mobile client devices 2 included in the content reception system 1000 are not limited to the example shown in the drawing and are arbitrary.

Figure 2:
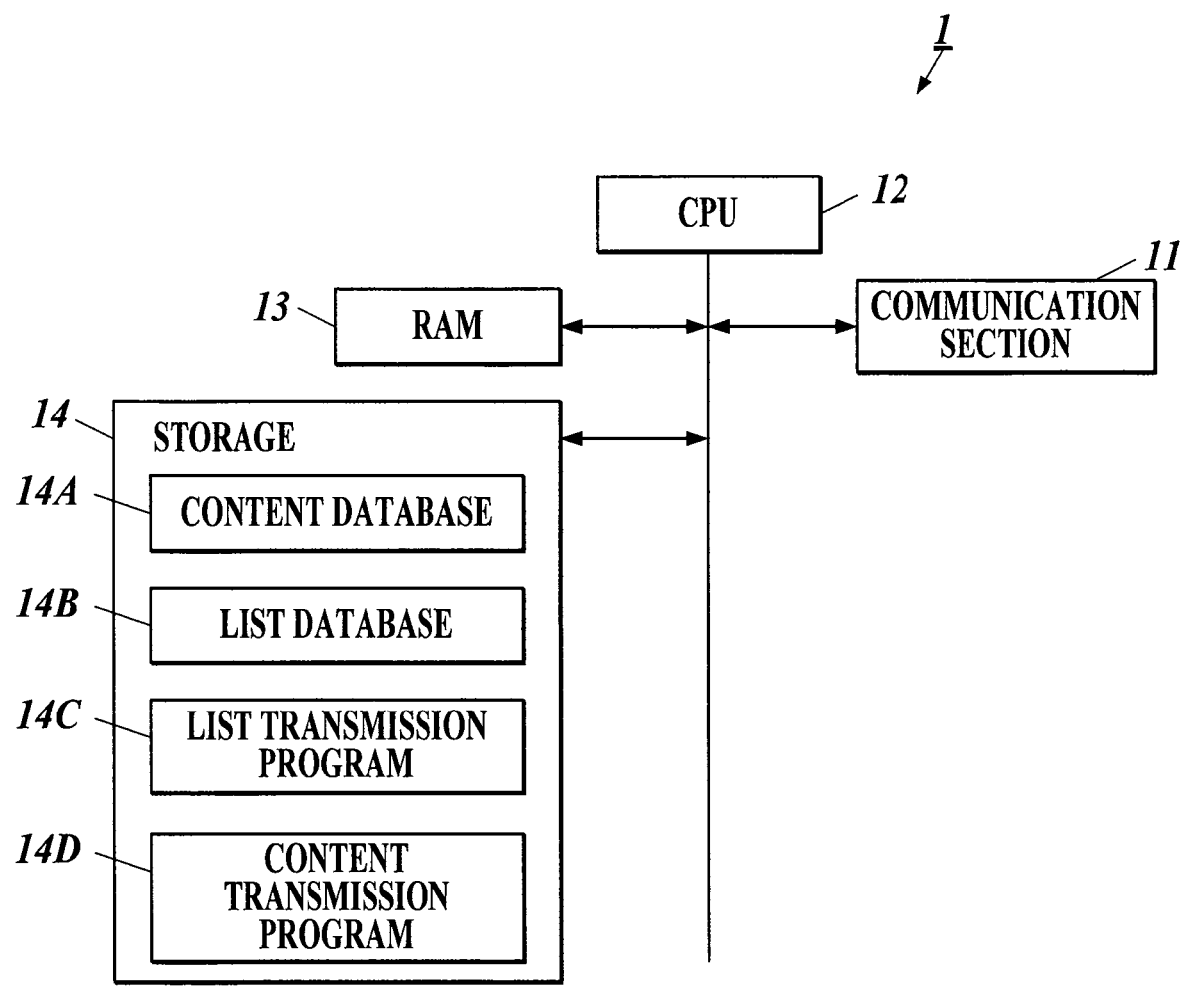
FIG. 2 is a block diagram showing an example of a configuration of a server according to the first embodiment of the present invention.

As shown in FIG. 2, the server 1 includes, for example, a communication section 11, a CPU (central processing unit) 12, a RAM (random access storage) 13, and a storage 14.

The communication section 11 is connected to, for example, the internet N and conducts communications between the server 1 and the mobile client devices 2 and the like.

The CPU 12 reads processing programs and the like stored in the storage 14 and expands the programs into the RAM 13 for execution to control the entire server 1.

The RAM 13 allows the processing programs executed by the CPU 12 and the like to be expanded into a program storage area of the RAM 13 and stores input data, processing results generated by execution of the above processing programs, and the like in a data storage area.

The storage 14 includes, for example, a recording medium (not shown) previously storing programs, data, and the like. The recording medium comprises, for example, a semiconductor memory or the like. The storage 14 stores various kinds of data for implementing a function of the CPU 12 to control the entire server 1, various kinds of processing programs, data processed by the programs, and the like. More specifically, as shown in FIG. 2, the storage 14 stores, for example, a content database 14A, a list database 14B, a list transmission program 14C, a content transmission program, and the like.

The content database 14A, for example, stores a plurality of contents and serves as a content storage unit and a first content storage unit.

The list database 14B, for example, stores a first content list of the plurality of contents stored in the content database 14A and serves as a list storage unit and a first list storage unit.

The list transmission program 14C is a program causing the CPU 12 to implement a function of controlling the communication section 11 to transmit at least a part of the first content list stored in the list database 14B to the mobile client device 2 upon receiving a list request signal from the mobile client device 2.

More specifically, the list transmission program 14C is a program causing the CPU 12 to implement a function of, for example, upon receiving later-described search criterion information and the list request signal from the mobile client device 2, controlling the communication section 11 to transmit list data of contents matching the search criteria from the first content list stored in the list database 14B to the mobile client device 2.

By executing the list transmission program 14, the CPU 12 functions as a transmission unit.

The content transmission program 14D is a program causing the CPU 12 to implement a function of, for example, upon receiving a content request signal from the mobile client device 2, retrieving a requested content from the content database 14A based on the content request signal and controlling the communication section 11 to transmit data of the retrieved content to the mobile client device 2.

Figure 3:
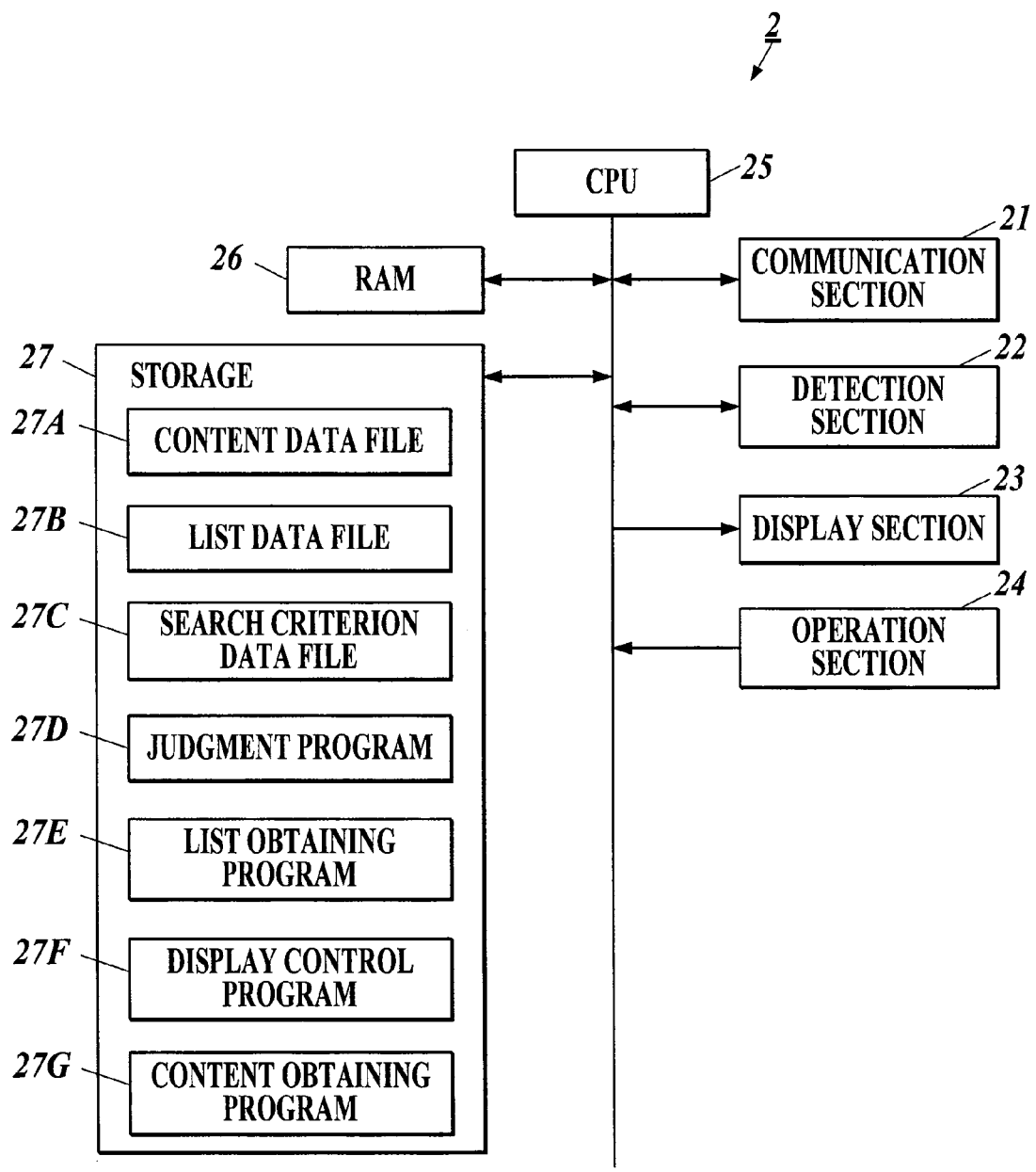
FIG. 3 is a block diagram showing an example of a configuration of a mobile client device according to the first embodiment of the present invention.

As shown in FIG. 3, each mobile client device 2 includes, for example, a communication section 21, a detection section 22, a display section 23, an operation section 24, a CPU 25, a RAM 26, and a storage 27.

The communication section 21 is connected to, for example, the internet N and conducts communications between the same mobile client device 2 and the server 1.

The detection section 22, for example, detects that an automobile including the mobile client device 2 mounted thereon is stopped. More specifically, the detection unit 22 includes an infrared sensor (not shown). The detection unit 22 receives infrared light emitted from an infrared emitter (not shown) provided for a garage of the automobile to detect that the automobile enters the garage and stops. The detection section 22 thus functions as a stop detection unit. The battery of the automobile remains on until the mobile client device 2 obtains the content list and contents even after the automobile is put into the garage and an engine thereof is stopped. The battery of the automobile is automatically turned off after the mobile client device 2 obtains the content list and contents.

The display section 23 comprises, for example, a liquid crystal display, a plasma display, or the like and displays various types of images. The display section 23 is controlled by a later-described display control program 27F executed by the CPU 25 to display a predetermined content list.

The operation section 24 includes, for example, various kinds of keys to input various operation signals and the like and is operated by a user to output various operation signals to the CPU 25.

For example, the operation section 24 outputs to the CPU 25 an operation signal to select a content desired by the user and functions as a selecting unit or a user selecting unit.

The CPU 25 reads processing programs and the like stored in the storage 27 and then expands the programs into the RAM 26 for execution to control the entire mobile client device 2.

The RAM 26 allows processing programs executed by the CPU 25 and the like to be expanded into a program storage area within the RAM 26 and stores input data, processing results produced by execution of the processing programs, and the like in a data storage area.

The storage 27 includes, for example, a recording medium (not shown) previously storing programs, data, and the like. The recording medium comprises, for example, a semiconductor memory or the like. The storage 27 stores various kinds of data for implementing functions of the CPU 25 to control the entire mobile client device 2, various kinds of processing programs, data processed by the programs, and the like. More specifically, as shown in FIG. 3, the storage 27 stores, for example, a content data file 27A, a list data file 27B, a search criterion data file 27C, a judgment program 27D, a list obtaining program 27E, a display control program 27F, a content obtaining program 27G, and the like.

The content data file 27A, for example, stores a content obtained by the CPU 25 executing the later-described content obtaining program 27G. The storage 27 stores the content data file 27A to function as a second content storage unit.

The list data file 27B, for example, stores a second content list of contents stored in the content data file 27A. The storage 27 stores the list data file 27B and functions as a second list storage unit.

The search criterion data file 27C, for example, stores predetermined search criteria to obtain a content list from the list database 14B of the sever 1. Herein, the search criteria are, for example, the period, category, cast names, author, and the like.

The judgment program 27D is, for example, a program causing the CPU 25 to implement a function of, after a predetermined period of time elapses since the detection section 22 detects that the automobile is stopped, judging that the movement of the mobile client device 2 is stopped. By executing the judgment program 27D, the CPU 25 functions as a judgment unit.

The list obtaining program 27E is, for example, a program causing the CPU 25 to implement a function of, when the CPU 25 judges by executing the judgment program 27D that the movement of the mobile client device 2 is stopped, obtaining a content list matching the search criteria stored in the search criterion data file 27C from the first content list stored in the list database 14B of the server 1.

More specifically, the list obtaining program 27E is, for example, a program causing the CPU 25 to implement a function of, when the CPU 25 judges by executing the judgment program 27D that the movement of the mobile client device 2 is stopped, controlling the communication section 21 to send the search criterion information stored in the search criterion data file 27C and the list request signal to the server 1 and receive list data which is transmitted from the server 1 and matches the search criteria.

By executing the list obtaining program 27E, the CPU 25 functions as a list obtaining unit.

The display control program 27F is, for example, a program causing the CPU 25 to implement a function of controlling the display section 23 to display a content list based on the list data obtained by execution of the list obtaining program 27E.

The content obtaining program 27G is, for example, a program causing the CPU 25 to implement the following function. The CPU 25 judges whether an operation signal to select a content from the content list displayed by the display section 23 is inputted from the operation section 24. When the CPU 25 judges that the operation signal to select a content from the content list displayed on the display section 23 is inputted from the operation section 24, the CPU 25 obtains the selected content from the content database 14A of the server 1 and updates the list data file 27B according to the operation signal. When the CPU 25 judges that the operation signal to select a content from the content list displayed on the display section 23 is not inputted from the operation section 24, the CPU 25 selects a content obtained by a difference between the content list displayed on the display section 23 and the second content list stored in the list data file 27B. The CPU 25 then obtains the selected content from the content database 14A of the server 1 and updates the list data file 27B.

More specifically, the content obtaining program 27G is, for example, a program causing the CPU 25 to implement the following function. The CPU 25 controls the communication section 21 to transmit to the server 1 the content request signal for the content selected according to the operation signal inputted from the operation section 24 or the content request signal for the content obtained by a difference between the content list displayed on the display section 23 and the second content list stored in the list data file 27B and receive content data of the content transmitted from the server 1. The CPU 25 stores the content data in the content data file 27A and updates the list data file 27B.

By executing the content obtaining program 27G, the CPU 25 functions as a selection unit, an automatic selection unit, and a content obtaining unit.

Figure 4:
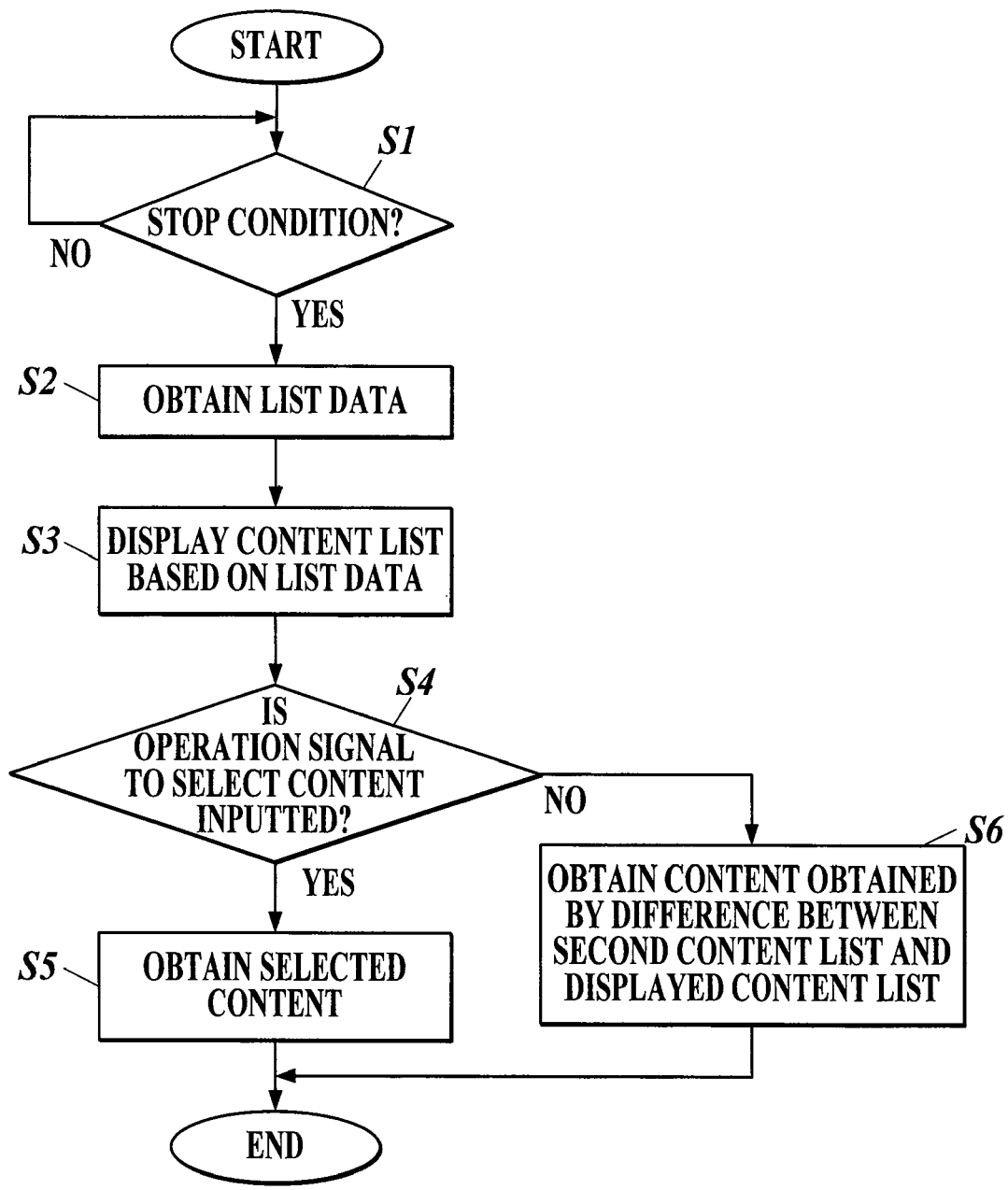
FIG. 4 is a flowchart explaining an example of a content obtaining operation of the mobile client device according to the first embodiment of the present invention.

Next, with reference to a flowchart shown in FIG. 4, a description is given of an example of a content obtaining operation of the mobile client device 2 in the content reception system 1000 according to the first embodiment of the present invention which has the aforementioned configuration.

First, the CPU 25 executes the judgment program 27D to judge whether movement of the mobile client device 2 is stopped by judging whether a predetermined period of time elapses since the detection section 22 detects that the automobile is stopped (step S1).

When the CPU 25 judges in the step S1 that the movement of the mobile client device 2 is not stopped (step 1; No), the process of the step S1 is repeated.

When the CPU 25 judges in the step S1 that the movement of the mobile client device 2 is stopped (step 1; Yes), the CPU 25 executes the list obtaining program 27E to obtain a content list matching the search criteria stored in the search criterion data file 27C from the first content list stored from the list database 14B of the server 1 (step S2).

Next, the CPU 25 executes the display control program 27F to control the display section 23 to display the content list obtained by execution of the list obtaining program 27.

Next, the CPU 25 executes the content obtaining program 27G to judge whether the operation signal to select a content from the content list displayed on the display section 23 is inputted from the operation section 24 (step S4).

When the CPU 25 judges in the step S4 that the operation signal to select a content from the content list displayed on the display section 23 is inputted from the operation section 24 (step S4; Yes), based on execution of the content obtaining program 27G, the CPU 25 obtains the selected content from the content database 14A of the server 1 and updates the list data file 27B according to the operation signal (step S5). The process is thus terminated.

When the CPU 25 judges in the step S4 that the operation signal to select a content from the content list displayed on the display section 23 is not inputted from the operation section 24 (step S4; No), based on execution of the content obtaining program 27G, the CPU 25 selects a content obtained by a difference between the content list displayed on the display section 23 and the second content list stored in the list data file 27B. The CPU 25 then obtains the selected content from the content database 14A of the server 1 and updates the list data file 27B (step S6). The process is thus terminated.

Figure 5:
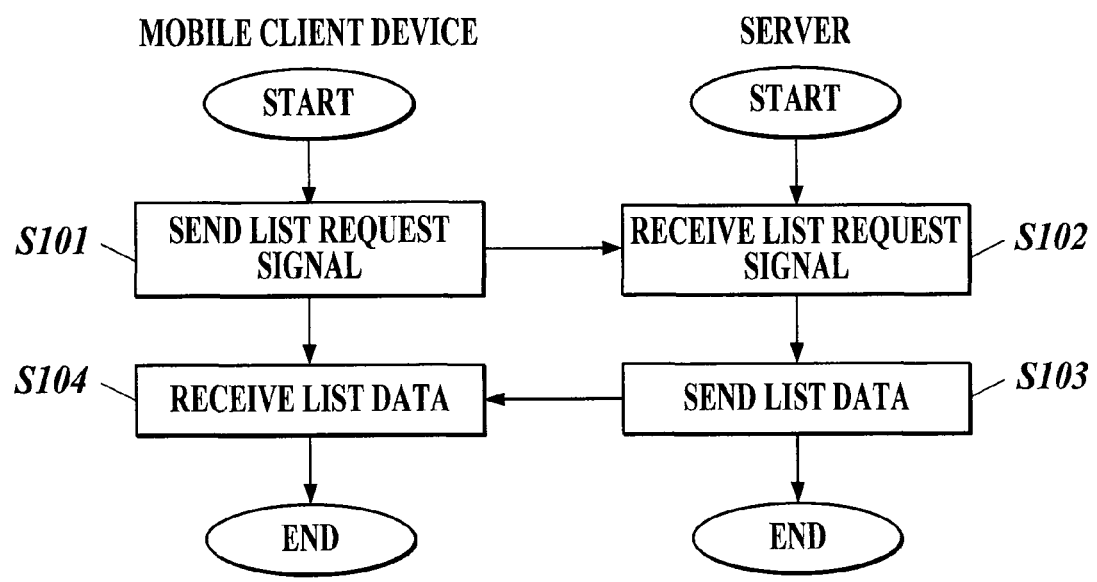
FIG. 5 is a flowchart explaining an example of a content list reception operation of the mobile client device according to the first embodiment of the present invention.

Next, a description is given of an example of a content list reception operation in the content reception system 1000 according to the first embodiment of the present invention with reference to a flowchart shown in FIG. 5.

First, in the mobile client device 2, the CPU 25 executes the list obtaining program 27E to control the communication section 21 to transmit to the server 1 the search criterion information stored in the search criterion data file 27C and the list request signal (step S101).

Next, when the server 1 receives the search criterion information and list request signal transmitted from the mobile client device 2 (step S102), the CPU 12 of the server 1 executes the list transmission program 14C to control the communication section 11 to send list data of contents matching the search criteria in the first content list stored in the list database 14 to the mobile client device 2 (step S103).

Next, the mobile client device 2 receives the list data transmitted from the server 1 (step S104), and the process is terminated.

Figure 6:
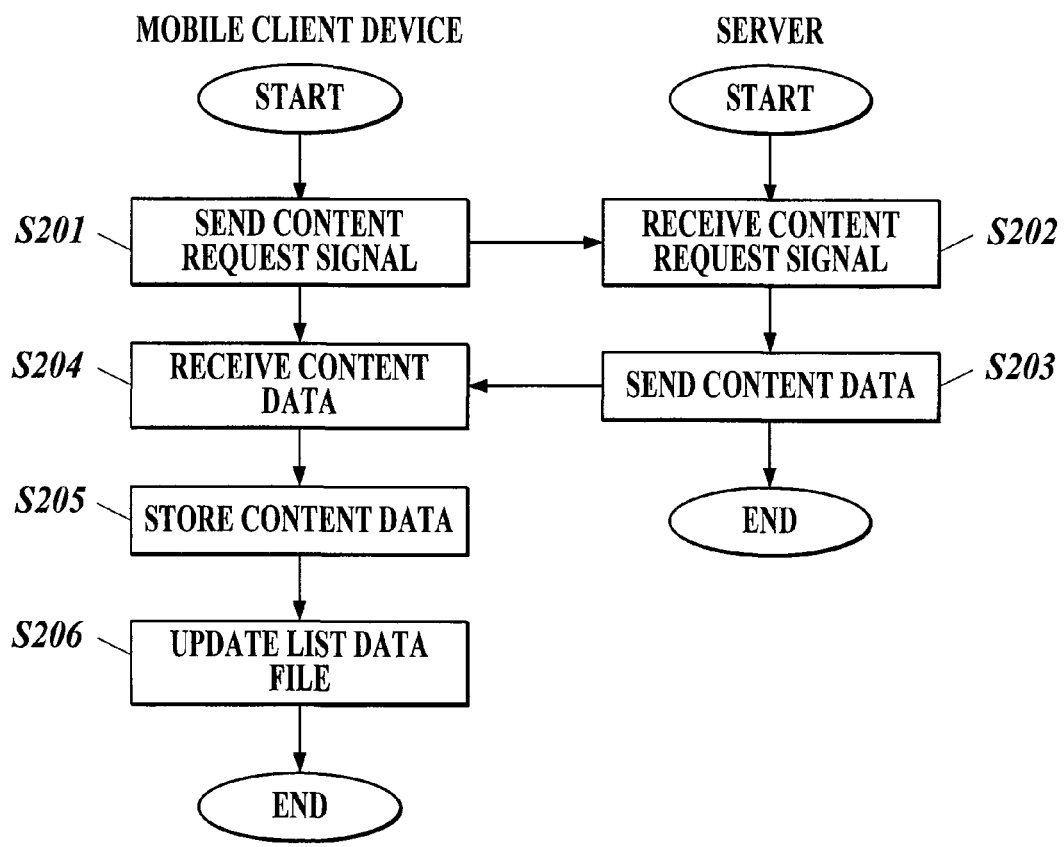
FIG. 6 is a flowchart explaining an example of a content reception operation of the mobile client device according to the first embodiment of the present invention.

Next, a description is given of an example of a content reception operation in the content reception system 1000 according to the present invention with reference to FIG. 6.

First, in the mobile client device 2, the CPU 25 executes the content obtaining program 27G to control the communication section 21 to send to the server 1 a content request signal for the content selected according to the operation signal inputted from the operation section 24 or a content request signal for the content obtained by a difference between the content list displayed on the display section 23 and the second content list stored in the list data file 27B (step S201).

Next, when the server 1 receives the content request signal transmitted from the mobile client device 2 (step S202), the CPU 12 of the server 1 executes the content transmission program 14D to retrieve the requested content based on the content request signal from the content database 14A and control the communication section 11 to transmit content data of the retrieved content to the mobile client device 2 (step S203).

Next, when the mobile client device 2 receives the content data of the content transmitted from the server 1 (step S204), based on execution of the content obtaining program 27G, the CPU 25 stores the content data in the content data file 27A (step S205) and updates the list data file 27B (step S206). The process is thus terminated.

With the above-described content reception system 1000 according to the present invention, in the server 1, the content database 14A stores a plurality of contents, and the list database 14B stores the first content list of the plurality of contents. In the mobile client device 2 mounted on the automobile, the content data file 27A stores contents. The detection section 22 detects that the automobile is stopped. By executing the judgment program 27D, the CPU 25 judges that the mobile client device 2 is stopped after a predetermined period of time elapses since the detection section 22 detects that the automobile is stopped. By executing the list obtaining program 27E, the CPU 25 obtains a content list matching the predetermined search criteria from the first content list stored in the list database 14B of the server 1 when it is judged by execution of the judgment program 27D that the movement of the mobile client device 2 is stopped. The list data file 27B stores the second content list of the contents stored in the content data file 27A. By executing the content obtaining program 27G, the CPU 25 selects a content obtained by a difference between the content list obtained by execution of the content obtaining program 27G and the second content list stored in the list data file 27B and obtains the selected content from the server 1. Accordingly, the content list and contents can be obtained without the user consciously stopping the movement of the mobile client device 2. As a result, the usability can be improved. The mobile client device 2 therefore can more suitably receive the content list and contents from the server 1.

Moreover, the contents and content list are obtained while the movement of the mobile client device 2 is stopped. Accordingly, the content list and contents can be obtained through secure communications. The mobile client device 2 can more reliably receive the content list and contents from the server 1.

Moreover, by executing the list obtaining program 27E, the CPU 25 obtains the content list matching the predetermined search criteria. Accordingly, the mobile client device 2 can receive from the server 1 only the minimum required amount of data, thus reducing the communication load.

In the mobile client device 2, the content data file 27A stores contents, and the list data file 27B stores the second content list of contents stored in the content data file 27A. By executing the content obtaining program 27G, the CPU 25 selects a content obtained by a difference between the content list obtained by executing the list obtaining program 27E and the second content list stored in the list data file 27B. Accordingly, it is possible to automatically select only contents which are not obtained yet and further improve the usability.

In the mobile client device 2, contents desired by the user are selected by the operation section 24 from the content list obtained by the CPU 25 executing the list obtaining program 27E. Accordingly, only the contents desired by the user can be selected and obtained from the content list, and the mobile client device 2 can receive the minimum required amount of data from the server 1, thus reducing communication load.

Second Embodiment

Figure 7:
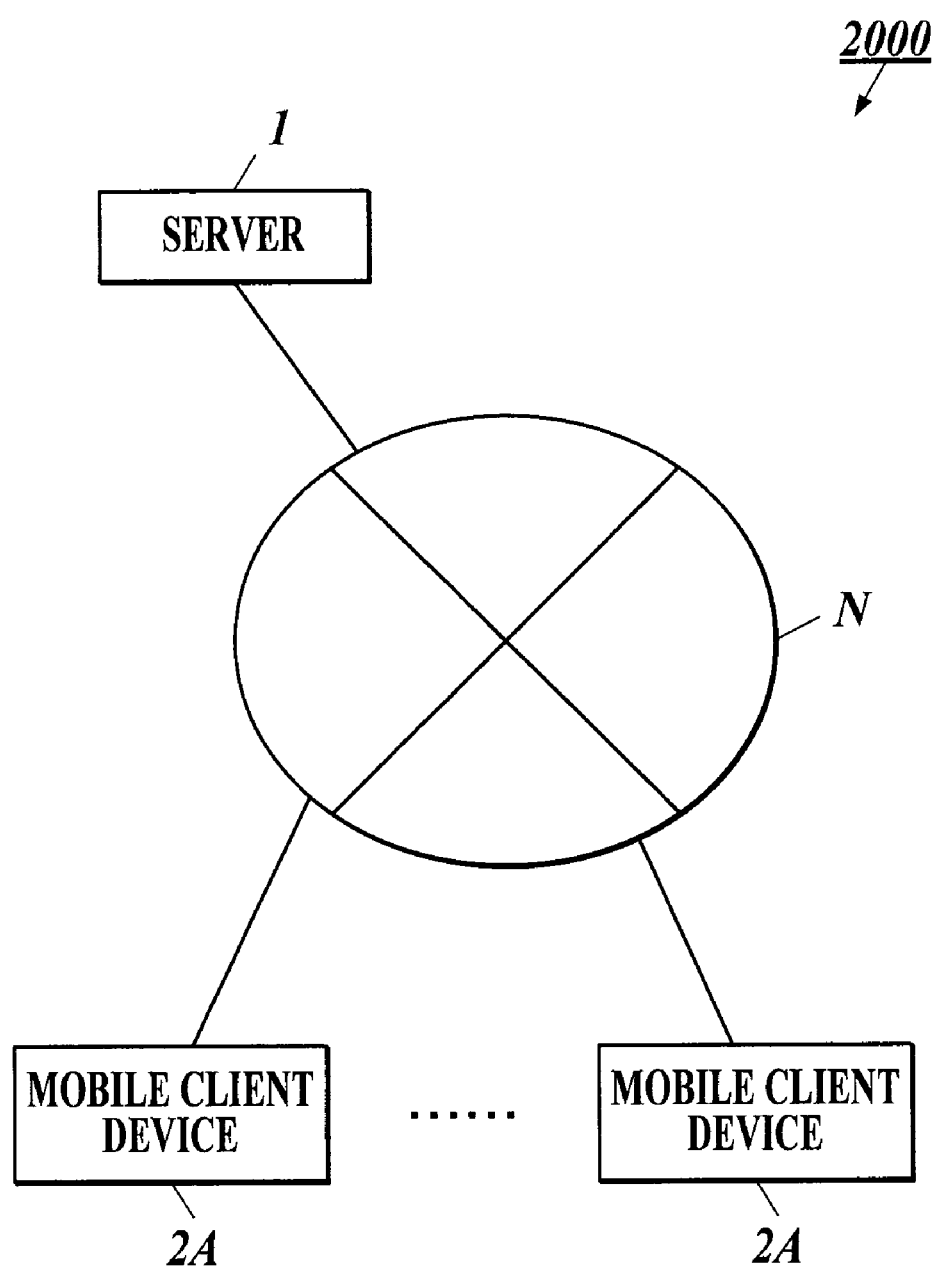
FIG. 7 is a view showing a schematic configuration of a content reception system according to a second embodiment of the present invention.

A content reception system 2000 according to the second embodiment of the present invention is, for example, as shown in FIG. 7, is the same as the content reception system 1000 according to the first embodiment except mobile client devices 2A which have a different configuration from that of the mobile client devices 2. The same components are given the same numerals, and the description thereof is omitted.

Figure 8:
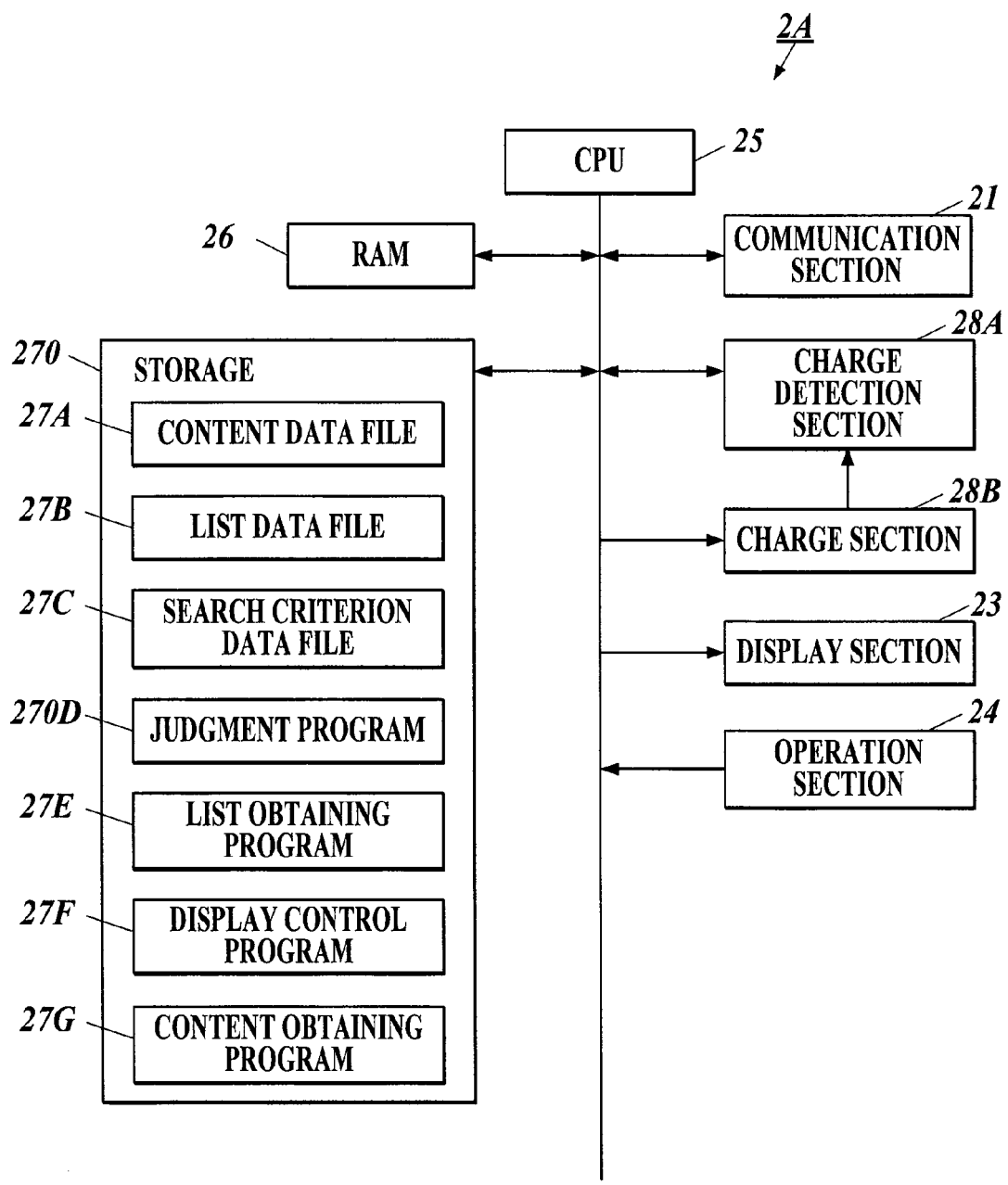
FIG. 8 is a block diagram showing an example of a configuration of a mobile client device according to the second embodiment of the present invention.

As shown in FIG. 8, each of the mobile client devices 2A according to the second embodiment of the present invention includes, for example, the communication section 21, a charge detection section 28A, a charge section 28B, the display section 23, the operation section 24, the CPU 25, the RAM 26, and a storage 270.

The mobile client device 2A is, for example, a high-mobility client device such as a mobile phone and driven by a chargeable battery charged by the charge section 28B.

The charge detection section 28A comprises, for example, a mechanical switch detecting connection with a predetermined power supply or a current detector detecting current supplied from a predetermined power supply. The charge detection section 28A detects that the charge battery is charged and functions as the stop detection unit.

The charge section 28B is, for example, connected to a predetermined power supply in a non-contact fashion to charge the chargeable battery of the mobile client device 2.

The storage 270 includes, for example, a recording medium (not shown) previously storing programs, data, and the like. The recording medium comprises, for example, a semiconductor memory or the like. The storage 270 stores various kinds of data for implementing functions of the CPU 25 to control the entire mobile client device 2A, various kinds of processing programs, data processed by the programs, and the like. More specifically, as shown in FIG. 8, the storage 270 stores, for example, the content data file 27A, the list data file 27B, the search criterion data file 27C, a judgment program 270D, the list obtaining program 27E, the display control program 27F, the content obtaining program 27G, and the like.

The judgment program 270D is, for example, a program causing the CPU 25 to implement a function of judging that the movement of the mobile client device 2A is stopped when the charge detection section 28A detects that the chargeable battery is charged by the charge section 28B. By executing the judgment program 270D, the CPU 25 functions as the judgment unit.

Figure 9:
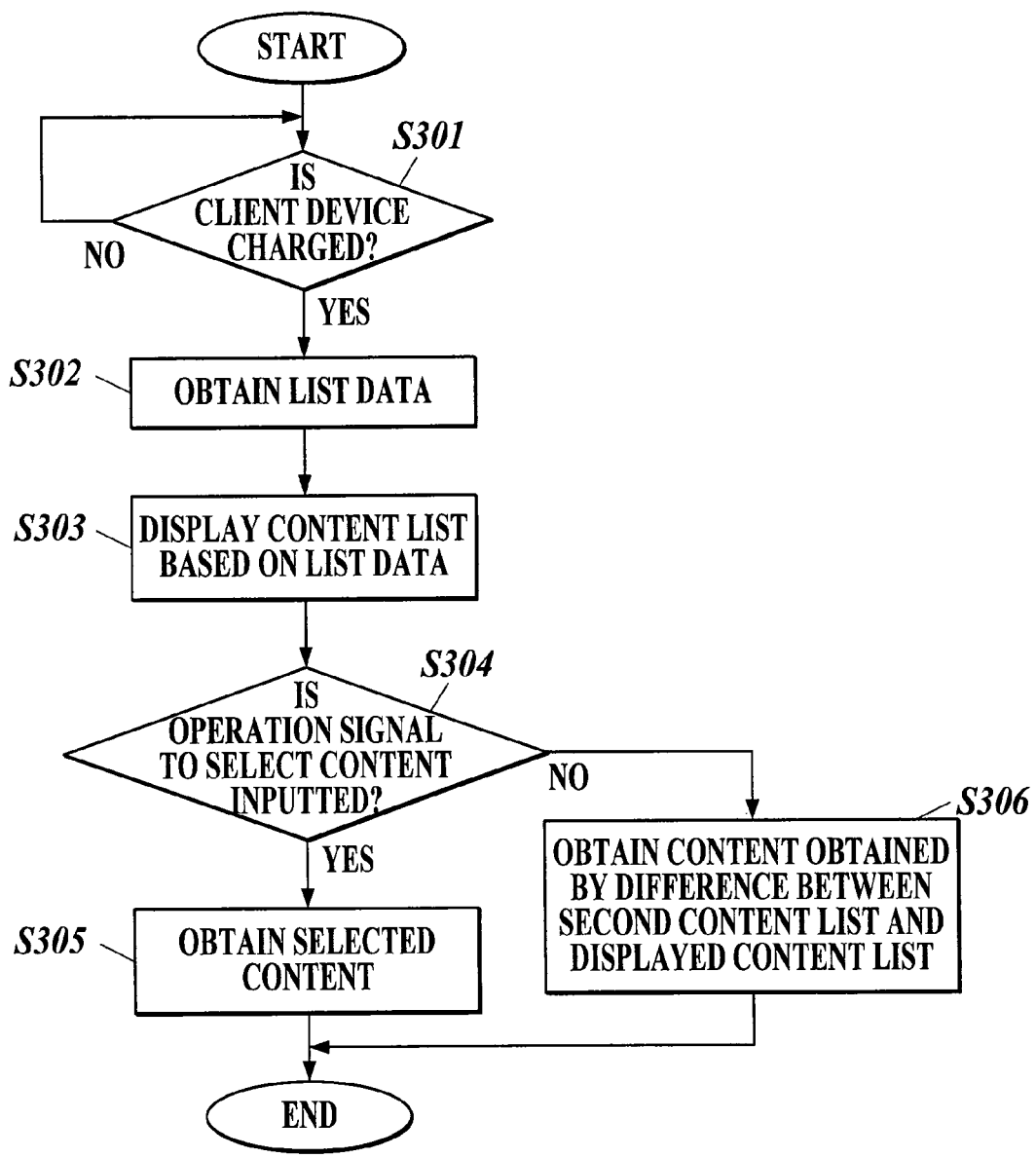
FIG. 9 is a flowchart explaining an example of a content obtaining operation of the mobile client device according to the second embodiment of the present invention.

Next, with reference to a flowchart shown in FIG. 9, a description is given of an example of a content obtaining operation of the mobile client device 2A in the content reception system 2000 according to the second embodiment of the present invention which has the aforementioned configuration.

First, the CPU 25 executes the judgment program 27D to judge whether movement of the mobile client device 2A is stopped depending on whether the charge detection section 28A detects that the chargeable battery is charged by the charge section 28 (step S301).

When the CPU 25 judges in the step S301 that the movement of the mobile client device 2A is not stopped (step S301; No), the process of the step S301 is repeated.

When the CPU 25 judges in the step S301 that the movement of the mobile client device 2A is stopped (step S301; Yes), the CPU 25 executes the list obtaining program 27E to obtain a content list matching the search criteria stored in the search criterion data file 27C from the first content list stored in the list database 14B of the server 1 (step S302).

Next, the CPU 25 executes the display control program 27F to control the display section 23 to display the content list obtained by execution of the list obtaining program 27E (step S303).

Next, the CPU 25 executes the content obtaining program 27G to judge whether the operation signal to select a content from the content list displayed on the display section 23 is inputted from the operation section 24 (step S304).

When the CPU 25 judges in the step S304 that the operation signal to select a content from the content list displayed on the display section 23 is inputted from the operation section 24 (step S304; Yes), based on execution of the content obtaining program 27G, the CPU 25 obtains the selected content from the content database 14A of the server 1 and updates the list data file 27B according to the operation signal (step S305). The process is thus terminated.

When the CPU 25 judges in the step S304 that the operation signal to select a content from the content list displayed on the display section 23 is not inputted from the operation section 24 (step S304; No), based on execution of the content obtaining program 27G, the CPU 25 selects a content obtained by a difference between the content list displayed on the display section 23 and the second content list stored in the list data file 27B. The CPU 25 then obtains the selected content from the content database 14A of the server 1 and updates the list data file 27B (step S306). The process is thus terminated.

With the above-described content reception system 2000 according to the second embodiment of the present invention, it is possible to provide similar effects to those of the content reception system 1000 according to the first embodiment. Moreover, particularly, in the mobile client device 2A, the charge section 28 charges the chargeable battery of the mobile client device 2A, and the charge detection section 28A detects that the chargeable battery is charged by the charge section 28B. By executing the judgment program 270D, the CPU 25 judges that the movement of the mobile client device 2A is stopped when the charge detection section 28A detects that the chargeable battery is charged by the charge section 28B. Accordingly, also in the case of the rechargeable mobile client device 2A, the content list and contents are obtained while the chargeable battery is charged by the charge section 28B and the movement of the mobile client device 2A is stopped. The mobile client device 2A therefore can receive the content list and contents from the server 1 more reliably and suitably.

Third Embodiment

Figure 10:
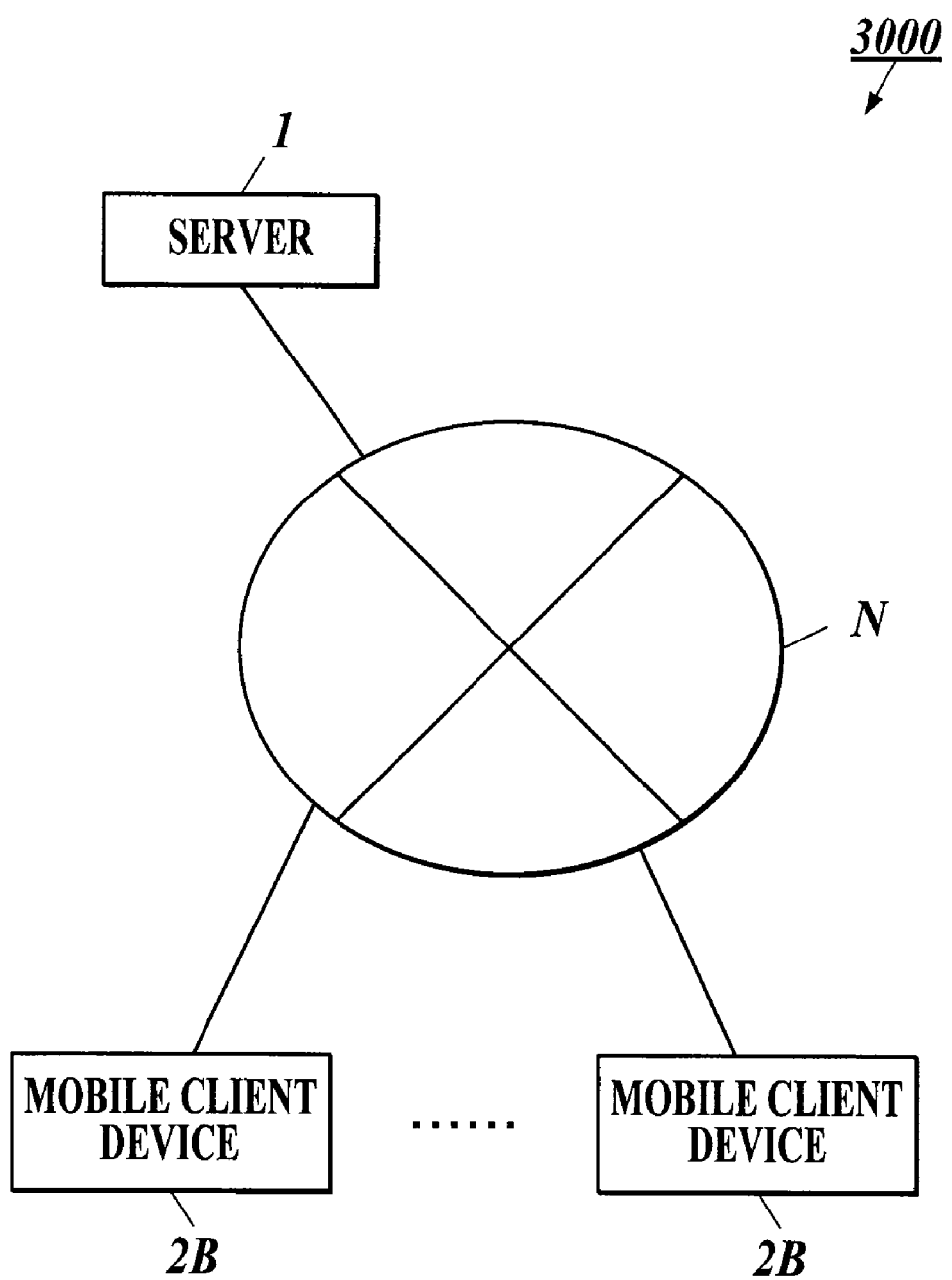
FIG. 10 is a view showing a schematic configuration of a content reception system according to a third embodiment of the present invention.

A content reception system 3000 according to a third embodiment of the present invention is, for example, as shown in FIG. 10, the same as the content reception system 1000 according to the first embodiment except mobile client devices 2B which has a configuration different from the mobile client devices 2. The same components are given the same numerals, and the description thereof is omitted.

Figure 11:
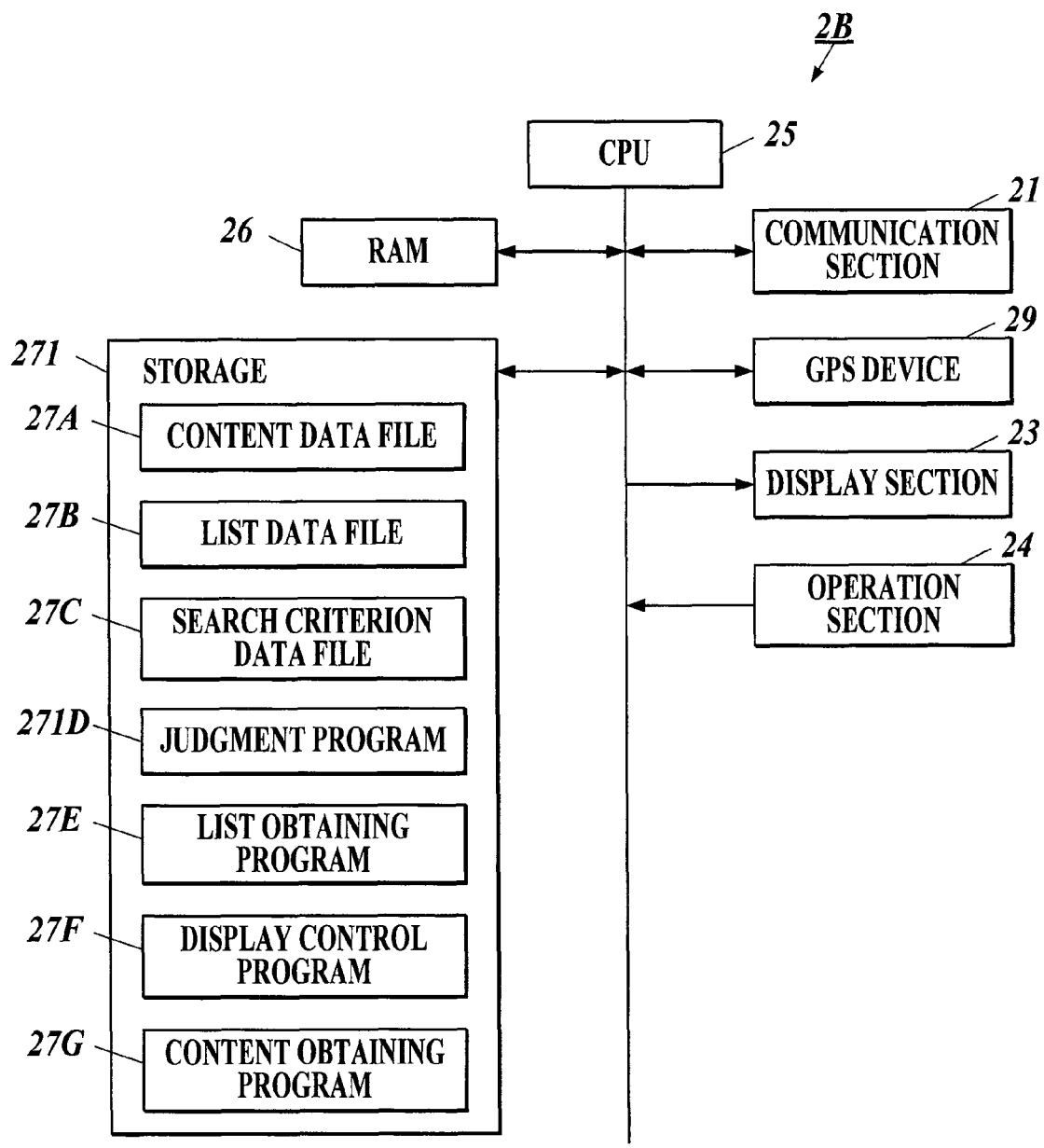
FIG. 11 is a block diagram showing an example of a configuration of a mobile client device according to the third embodiment of the present invention.

As shown in FIG. 11, each of the mobile client devices 2B according to the third embodiment of the present invention includes, for example, the communication section 21, a GPS (global positioning system) device 29, the display section 23, the operation section 24, the CPU 25, the RAM 26, and a storage 271.

The GPS device 29, for example, receives radio signals including data on the orbits of GPS satellites and times from the GPS satellites and detects a position of the mobile client device 2B based on a time difference between the radio signals. The GPS device 29 thus functions as a position detection unit.

The storage 271 includes, for example, a recording medium (not shown) previously storing programs, data, and the like. The recording medium comprises, for example, a semiconductor memory or the like. The storage 271 stores various kinds of data for implementing functions of the CPU 25 to control the entire mobile client device 2B, various kinds of processing programs, data processed by the programs, and the like. More specifically, as shown in FIG. 11, the storage 271 stores, for example, the content data file 27A, the list data file 27B, the search criterion data file 27C, a judgment program 271D, the list obtaining program 27E, the display control program 27F, the content obtaining program 27G, and the like.

The judgment program 271D is, for example, a program causing the CPU 25 to implement a function of judging that the movement of the mobile client device 2B is stopped after a predetermined period of time elapses since the position of the mobile client device 2B detected by the GPS device 29 enters a predetermined range. By executing the judgment program 271D, the CPU 25 functions as the judgment unit.

Figure 12:
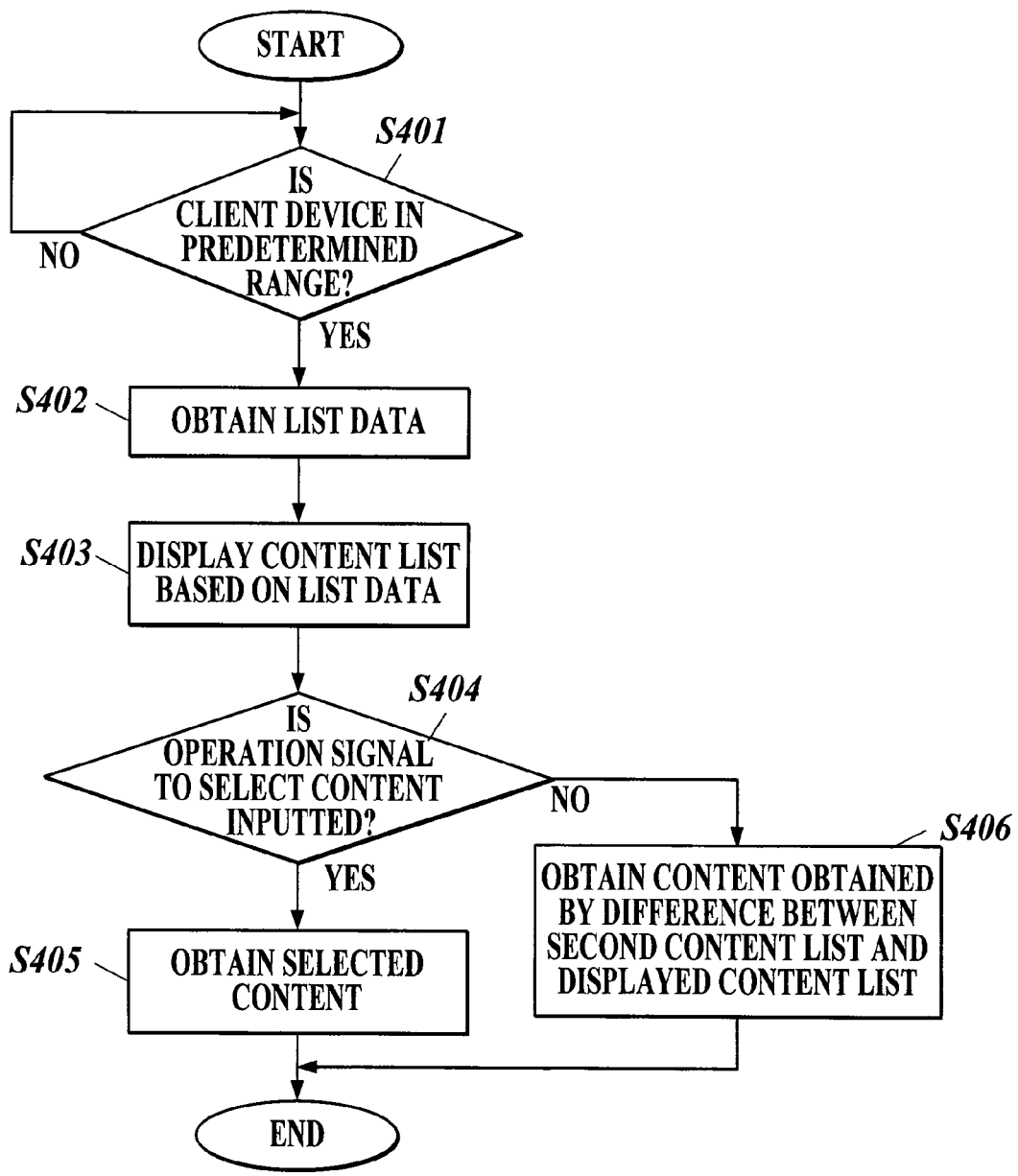
FIG. 12 is a flowchart explaining an example of a content obtaining operation of the mobile client device according to the third embodiment of the present invention.

Next, with reference to a flowchart shown in FIG. 12, a description is given of an example of a content obtaining operation of the mobile client device 2B in the content reception system 3000 according to the third embodiment of the present invention which has the aforementioned configuration.

First, the CPU 25 executes the judgment program 271D to judge whether the movement of the mobile client device 2B is stopped by judging whether the predetermined period of time elapses since the position of the mobile client device 2B detected by the GPS device 29 enters the predetermined range (step S401).

When the CPU 25 judges in the step S401 that the movement of the mobile client device 2B is not stopped (step S401; No), the process of the step S401 is repeated.

When the CPU 25 judges in the step S401 that the movement of the mobile client device 2B is stopped (step S401; Yes), the CPU 25 executes the list obtaining program 27E to obtain a content list matching the search criteria stored in the search criterion data file 27C from the first content list stored in the list database 14B of the server 1 (step S402).

Next, the CPU 25 executes the display control program 27F to control the display section 23 to display the content list obtained by execution of the list obtaining program 27E (step S403).

Next, the CPU 25 executes the content obtaining program 27G to judge whether the operation signal to select a content from the content list displayed on the display section 23 is inputted from the operation section 24 (step S404).

When the CPU 25 judges in the step S404 that the operation signal to select a content from the content list displayed on the display section 23 is inputted from the operation section 24 (step S404; Yes), based on execution of the content obtaining program 27G, the CPU 25 obtains the selected content from the content database 14A of the server 1 and updates the list data file 27B according to the operation signal (step S405). The process is thus terminated.

When the CPU 25 judges in the step S404 that the operation signal to select a content from the content list displayed on the display section 23 is not inputted from the operation section 24 (step S404; No), based on execution of the content obtaining program 27G, the CPU 25 selects a content obtained by a difference between the content list displayed on the display section 23 and the second content list stored in the list data file 27B. The CPU 25 then obtains the selected content from the content database 14A of the server 1 and updates the list data file 27B (step S406). The process is thus terminated.

With the above-described content reception system 3000 according to the third embodiment of the present invention, it is possible to obtain similar effects to those of the content reception system 1000 according to the first embodiment. Moreover, particularly, in the mobile client device 2B, the GPS device 29 detects the position of the mobile client device 2B. By executing the judgment program 271D, the CPU 25 judges that the mobile client device 2B is stopped after the predetermined period of time elapses since the position of the mobile client device 2B enters the predetermined range. The content list and contents are obtained when the mobile client device 2B is located in the predetermined range where the movement of the mobile client device 2B is usually stopped, for example, such as when the automobile on which the mobile client device 2B is mounted is put in a garage. Accordingly, the mobile client device 2B can receive the content list and contents from the server 1 more reliably and suitably.

The detection method of the detection section 22 of the mobile client device 2 according to the first embodiment may be any method which is capable of detecting whether the automobile is stopped. For example, the detection section may detect that the automobile is stopped by detecting that the engine is stopped when the battery is on.

In accordance with a first aspect of the preferred embodiments of the present invention, a content reception system, comprises:

a server; and a mobile client device which is connected to the server through a network to receive a content transmitted from the server and is mounted on an automobile, wherein the server comprises:

a first content storage unit for storing a plurality of contents;

a first list storage unit for storing a first content list of the plurality of contents; and a transmission unit for transmitting at least a part of the contents stored in the first content storage unit and a part of the first content list stored in the first list storage unit to the mobile client device according to a request from the mobile client device, and wherein the mobile client device comprises:

a second content storage unit for storing contents;

a stop detection unit for detecting that the automobile is stopped;

a judgment unit for judging that the mobile client device is stopped after a predetermined period of time elapses since the stop detection unit detects that the automobile is stopped;

a list obtaining unit for obtaining a content list matching a predetermined search criterion from the first content list stored in the first list storage unit of the server when the judgment unit judges that the mobile client device is stopped;

a second list storage unit for storing a second content list of the contents stored in the second content storage unit;

an automatic selection unit for selecting a content obtained by a difference between the content list obtained by the list obtaining unit and the second content list stored in the second list storage unit; and a content obtaining unit for obtaining the content selected by the automatic selection unit, from the server.

According to first aspect of the preferred embodiments of the present invention, in a server, a first content storage unit stores a plurality of contents; a first list storage unit stores a first content list of the plurality of contents; and a transmission unit transmits at least a part of the contents stored in the first content storage unit and a part of the first content list stored in the first list storage unit to the mobile client device according to a request from the mobile client device. In a mobile client device mounted on an automobile, a second content storage unit stores contents, and a stop detection unit detects that the automobile is stopped. A judgment unit judges that the mobile client device is stopped after a predetermined period of time elapses since the stop detection unit detects that the automobile is stopped. A list obtaining unit obtains a content list matching a predetermined search criterion from the first content list stored in the first list storage unit of the server when the judgment unit judges that the mobile client device is stopped. A second list storage unit stores a second content list of the contents stored in the second content storage unit. An automatic selection unit selects a content obtained by a difference between the content list obtained by the list obtaining unit and the second content list stored in the second list storage unit. A content obtaining unit obtains from the server the content selected by the automatic selection unit. Accordingly, the content list and contents can be obtained at a suitable time without the user consciously stopping the movement of the mobile client device, thus improving the usability. The mobile client device can therefore more suitably receive the content list and contents from the server.

Moreover, the contents and content list are obtained while the movement of the mobile client device is stopped. Accordingly, the content list and contents can be obtained through secure communications. The mobile client device can more reliably receive the content list and contents from the server.

Moreover, the list obtaining unit obtains the content list matching the predetermined search criteria. Accordingly, the mobile client device can receive only the minimum required amount of data from the server. As a result, the communication load can be reduced.

In the mobile client device, the second content storage unit stores contents, and the second list storage unit stores the second content list of contents stored in the second content storage unit. The automatic selection unit selects the content obtained by a difference between the content list obtained by the list obtaining unit and the second content list stored in the second list storage unit. Accordingly, it is possible to automatically select only contents which are not obtained yet and further improve the usability.

In accordance with a second aspect of the preferred embodiments of the present invention, a content reception system, comprises:

a server; and a mobile client device which is connected to the server through a network to receive a content transmitted from the server, wherein the server comprises:

a content storage unit for storing a plurality of contents; and a list storage unit for storing a content list of the plurality of contents, and wherein the mobile client device comprises:

a stop detection unit for detecting that movement of the mobile client device is stopped;

a judgment unit for judging that the mobile client device is in a predetermined stop state based on a detecting result obtained by the stop detection unit;

a list obtaining unit for obtaining at least a part of the content list from the list storage unit of the server when the judgment unit judges that the mobile client device is in the stop state;

a selection unit for selecting a content from the content list obtained by the list obtaining unit; and a content obtaining unit for obtaining the content selected by the selection unit, from the server.

According to a second aspect of the preferred embodiments of the present invention, in a server, a content storage unit stores a plurality of contents, and a list storage unit stores a content list of the plurality of contents. In a mobile client device, a stop detection unit detects that movement of the mobile client device is stopped, and a judgment unit judges that the mobile client device is in a predetermined stop state based on a result of the detection by the stop detection unit. A list obtaining unit obtains a content list from the list storage unit of the server when the judgment unit judges that the mobile client device is in the predetermined stop state, and a selection unit selects a content from the content list obtained by the list obtaining unit, and a content obtaining unit obtains from the server the content selected by the selection unit. Accordingly, the content list and contents can be obtained at a suitable time without the user consciously stopping the movement of the mobile client device and obtaining the content list and contents, thus improving the usability. The mobile client device can therefore more suitably receive the content list and contents from the server.

Moreover, the contents and content list are obtained while the movement of the mobile client device is stopped. Accordingly, the content list and contents can be obtained through secure communications. The mobile client device can more reliably receive the content list and contents from the server.

Preferably, the mobile client device is mounted on an automobile, and the judgment unit judges that the mobile client device is in the stop state after a predetermined period of time elapses since the stop detection unit detects that the mobile client device is stopped.

In this case, it is possible to obtain similar effects to those of the second aspect of the preferred embodiments of the present invention. In addition, particularly, the mobile client device is mounted on an automobile, and the judgment unit judges that the mobile client device is in the stop state after a predetermined period of time elapses since the stop detection unit detects that movement of the mobile client device is stopped. Accordingly, also in the mobile client device mounted on an automobile, the content list and contents are obtained while the movement of the mobile client device is in the stop state, and the mobile client device can receive the content list and contents from the server more reliably and suitably.

Preferably, the mobile client device further comprises:

a charge section for charging a chargeable battery of the mobile client device, and the stop detection unit detects that the chargeable battery is charged by the charge section, and the judgment unit judges that the mobile client device is in the stop state when the stop detection unit detects that the chargeable battery is charged by the charge section.

In this case, it is possible to obtain similar effects to those of the second aspect of the preferred embodiments of the present invention. In addition, particularly, in the mobile client device, a charge section charges a chargeable battery of the mobile client device, and the stop detection unit detects that the chargeable battery is charged by the charge section. The judgment unit judges that the mobile client device is in the stop state when the stop detection unit detects that the chargeable battery is charged by the charge section. Accordingly, also in the rechargeable mobile client device, the content list and contents are obtained when the chargeable battery is charged by the charge section and the movement of the mobile client device is in the stop state, and the mobile client device can receive the content list and contents more reliably and suitably.

Preferably, the stop detection unit comprises a position detection unit for detecting a position of the mobile client device, and the judgment unit judges that the mobile client device is in the stop state after a predetermined period of time elapses since the position of the mobile client device, which is detected by the position detection unit enters a predetermined range.

In this case, it is possible to obtain similar effects to those of the second aspect of the preferred embodiments of the present invention. In addition, particularly, in the mobile client device, a position detection unit detects a position of the mobile client device, and the judgment unit judges that the mobile client device is in the stop state after a predetermined period of time elapses since the position of the mobile client device detected by the position detection unit enters a predetermined range. Accordingly, the content list and contents are obtained when the mobile client device enters the predetermined range where the movement of the mobile client device is usually stopped, for example, such as when the automobile on which the mobile client device is mounted enters a garage. The mobile client device can therefore receive the content list and contents from the server more reliably and suitably.

Preferably, the mobile client device further comprises:

a second content storage unit for storing contents; and a second list storage unit for storing a second content list of the contents stored in the second content storage unit, and the selection unit further comprises:

an automatic selection unit for selecting a content obtained by a difference between the content list obtained by the list obtaining unit and the second content list stored in the second list storage unit.

In this case, it is possible to obtain similar effects to those of the second aspect of the preferred embodiments of the present invention. In addition, particularly, in the mobile client device, a second content storage unit stores contents, and a second list storage unit stores a second content list of the contents stored in the second content storage unit. An automatic selection unit selects a content obtained by a difference between the content list obtained by the list obtaining unit and the second content list stored in the second list storage unit. Accordingly, it is possible to automatically select only contents which are not obtained yet and further improve the usability.

Preferably, the selection unit comprises a user selection unit for selecting a content desired by a user from the content list obtained by the list obtaining unit.

In this case, it is possible to obtain similar effects to those of the second aspect of the preferred embodiments of the present invention. In addition, particularly, in the mobile client device, a user selection unit selects a content desired by the user from the content list obtained by the list obtaining unit. Accordingly, it is possible to select only contents which are desired by a user from the content list. The mobile client device can therefore receive only the minimum required amount of data from the server. As a result, the communication load is reduced.

The entire disclosure of Japanese Patent Application No. 2006-253024 filed on Sep. 19, 2006 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A content reception system, comprising:
a server; and
a mobile client device which is connected to the server through a network to receive a content transmitted from the server and is mounted on an automobile, wherein
the server comprises:
a first content storage unit for storing a plurality of contents;
a first list storage unit for storing a first content list of the plurality of contents; and
a transmission unit for transmitting at least a part of the contents stored in the first content storage unit and a part of the first content list stored in the first list storage unit to the mobile client device according to a request from the mobile client device, and wherein
the mobile client device comprises:
a second content storage unit for storing contents;
a stop detection unit for detecting that the automobile is stopped;
a judgment unit for judging that the mobile client device is stopped after a predetermined period of time elapses since the stop detection unit detects that the automobile is stopped;
a list obtaining unit for obtaining a content list matching a predetermined search criterion from the first content list stored in the first list storage unit of the server when the judgment unit judges that the mobile client device is stopped;
a second list storage unit for storing a second content list of the contents stored in the second content storage unit;
an automatic selection unit for selecting a content obtained by a difference between the content list obtained by the list obtaining unit and the second content list stored in the second list storage unit; and
a content obtaining unit for obtaining the content selected by the automatic selection unit, from the server.

2. A content reception system, comprising:
a server; and
a mobile client device which is connected to the server through a network to receive a content transmitted from the server, wherein the server comprises:
a content storage unit for storing a plurality of contents; and
a list storage unit for storing a content list of the plurality of contents, and wherein
the mobile client device comprises:
a stop detection unit for detecting that movement of the mobile client device is stopped;
a judgment unit for judging that the mobile client device is in a predetermined stop state based on a detecting result obtained by the stop detection unit;
a list obtaining unit for obtaining at least a part of the content list from the list storage unit of the server when the judgment unit judges that the mobile client device is in the stop state;
a selection unit for selecting a content from the content list obtained by the list obtaining unit;
a content obtaining unit for obtaining the content selected by the selection unit, from the server,
a charge section for charging a chargeable battery of the mobile client device, and
the stop detection unit detects that the chargeable battery is charged by the charge section, and
the judgment unit judges that the mobile client device is in the stop state when the stop detection unit detects that the chargeable batter is charged by the charge section.

3. The content reception system as claimed in claim 2, wherein
the mobile client device is mounted on an automobile, and
the judgment unit judges that the mobile client device is in the stop state after a predetermined period of time elapses since the stop detection unit detects that the mobile client device is stopped.

4. The content reception system as claimed in claim 2, wherein
the stop detection unit comprises a position detection unit for detecting a position of the mobile client device, and
the judgment unit judges that the mobile client device is in the stop state after a predetermined period of time elapses since the position of the mobile client device, which is detected by the position detection unit enters a predetermined range.

5. The content reception system as claimed in claim 2, wherein
the mobile client device further comprises:
a second content storage unit for storing contents; and
a second list storage unit for storing a second content list of the contents stored in the second content storage unit, and
the selection unit further comprises:
an automatic selection unit for selecting a content obtained by a difference between the content list obtained by the list obtaining unit and the second content list stored in the second list storage unit.

6. The content reception system as claimed in claim 2, wherein
the selection unit comprises a user selection unit for selecting a content desired by a user from the content list obtained by the list obtaining unit.

* * * * *